(12) United States Patent
Sharma et al.

(10) Patent No.: US 11,750,625 B1
(45) Date of Patent: Sep. 5, 2023

(54) DATA BREACH MONITORING AND REMEDIATION

(71) Applicant: Wells Fargo Bank, N.A., San Francisco, CA (US)

(72) Inventors: Vivek Sharma, Bengaluru (IN); Dipanjan Deb, Bangalore (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 169 days.

(21) Appl. No.: 16/710,959

(22) Filed: Dec. 11, 2019

(51) Int. Cl.
G06Q 20/10 (2012.01)
H04L 9/40 (2022.01)
G06Q 50/26 (2012.01)

(52) U.S. Cl.
CPC ....... *H04L 63/1416* (2013.01); *G06Q 20/108* (2013.01); *G06Q 50/265* (2013.01); *H04L 63/10* (2013.01)

(58) Field of Classification Search
None
See application file for complete search history.

(56) References Cited

U.S. PATENT DOCUMENTS

| 8,407,194 | B1 | 3/2013 | Chaput et al. | |
|---|---|---|---|---|
| 8,626,671 | B2 | 1/2014 | Federgreen | |
| 8,793,804 | B2 | 7/2014 | Bekker et al. | |
| 9,032,531 | B1 * | 5/2015 | Scorvo | G06F 21/6254 726/25 |
| 9,077,747 | B1 | 7/2015 | Chen et al. | |
| 10,021,118 | B2 | 7/2018 | Wardman et al. | |
| 10,142,361 | B2 | 11/2018 | Howe | |
| 10,204,238 | B2 | 2/2019 | Sher-Jan et al. | |
| 10,275,613 | B1 * | 4/2019 | Olenoski | H04L 63/20 |
| 2009/0089591 | A1 * | 4/2009 | Mattsson | G06F 21/6236 713/193 |
| 2010/0205014 | A1 | 8/2010 | Sholer et al. | |
| 2013/0262328 | A1 | 10/2013 | Federgreen | |
| 2014/0089039 | A1 | 3/2014 | McClellan | |
| 2014/0142988 | A1 * | 5/2014 | Grosso | G06Q 10/10 705/4 |
| 2015/0154520 | A1 | 6/2015 | Federgreen et al. | |
| 2015/0254639 | A1 * | 9/2015 | Radu | G06Q 20/36 705/41 |
| 2015/0347965 | A1 | 12/2015 | Wardman et al. | |
| 2016/0078566 | A1 * | 3/2016 | Farrell | G06Q 10/10 705/30 |
| 2017/0243009 | A1 | 8/2017 | Sejpal et al. | |
| 2017/0331839 | A1 * | 11/2017 | Park | G06F 21/577 |
| 2018/0083843 | A1 | 3/2018 | Sambandam | |
| 2019/0108363 | A1 * | 4/2019 | Caldwell | G06F 21/6245 |
| 2019/0124100 | A1 | 4/2019 | Shannon et al. | |
| 2020/0193018 | A1 * | 6/2020 | Van Dyke | G06F 21/552 |
| 2021/0264336 | A1 * | 8/2021 | Mo | G06Q 10/0635 |
| 2021/0334395 | A1 * | 10/2021 | Robinson | G06F 21/45 |

* cited by examiner

*Primary Examiner* — William J Jacob
(74) *Attorney, Agent, or Firm* — Womble Bond Dickinson (US) LLP

(57) ABSTRACT

Sharing of user data of customers of a first party with a third party is monitored. The data is presented to customers to enable transparency with respect to what data is provided to whom. Furthermore, remediation is promptly triggered in response to a third-party data breach. After breach detection, customers and data affected by the breach is determined. The type of remediation is determined based on the risk as determined based on the customers affected by the data involved.

17 Claims, 10 Drawing Sheets

DATA BREACH MONITORING AND REMEDIATION

BACKGROUND

Collection of user data online is an increasingly ubiquitous practice. The data can be utilized to tailor features or content to a user to provide a personalized experience, among other things. In some instances, the data can be shared with external parties. However, there are user privacy risks associated with both collection and sharing of data with user consent. For instance, data could be shared more broadly than a user intended or employed in a manner beyond what was expected. Moreover, security-related instances, such as data breaches, can compromise user privacy.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data sharing and data breach remediation. Sharing of data about an individual between two different parties can be monitored and saved. In one instance, data about customers of a first party can be shared with a third party, and such a data transaction recorded. Collected user data can be made available to users to aid understanding of what data about the user was shared and with whom. Further, data breaches can be detected, and individuals affected by such a breach determined. After detection, remediation can be initiated as a function of risk severity as determined based on a number of factors including type and volume of data compromised as well as the number of individuals affected by a data breach.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

User data relating to an individual can be transferred frequently online with or without knowledge of the individual to whom the data pertains. Such data can be utilized to personalize an experience or provide targeted advertising, among other things. For example, if one signs up for a promotional offer from a vendor, user data including name, address, and email address, among other things, can be provided manually or automatically. However, an individual may not know or remember what data was provided to whom. Furthermore, data breaches can unintentionally expose the user data. Absent knowledge of what kinds of data were provided to whom, a response to the data breach can be non-proportional or unnecessary. For instance, upon learning of a data breach a user may panic and react by canceling all credit and debit cards, closing accounts, and contacting credit agencies.

Details provided herein generally pertain to data sharing and breach remediation. Sharing of user data online can be monitored. Data provided and the receiving party can be determined and captured. Information about the user data and receiving party can be exposed in a graphical user interface, for instance, to provide transparency to individuals with respect to data pertaining to the individuals. After the occurrence of a data breach, the graphical user interface can be utilized to identify potentially compromised data. Furthermore, remediation can be automatically initiated based on risk severity associated with the breach. The risk severity can be determined based on a number of factors including data type and volume as well as number of individuals affected. In one instance, notification can be provided to those affected or unaffected by a data breach. For those affected by the breach, actions can be suggested or automatically performed that seek to protect an affected individual from further loss as well as reimburse the individual for losses incurred.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
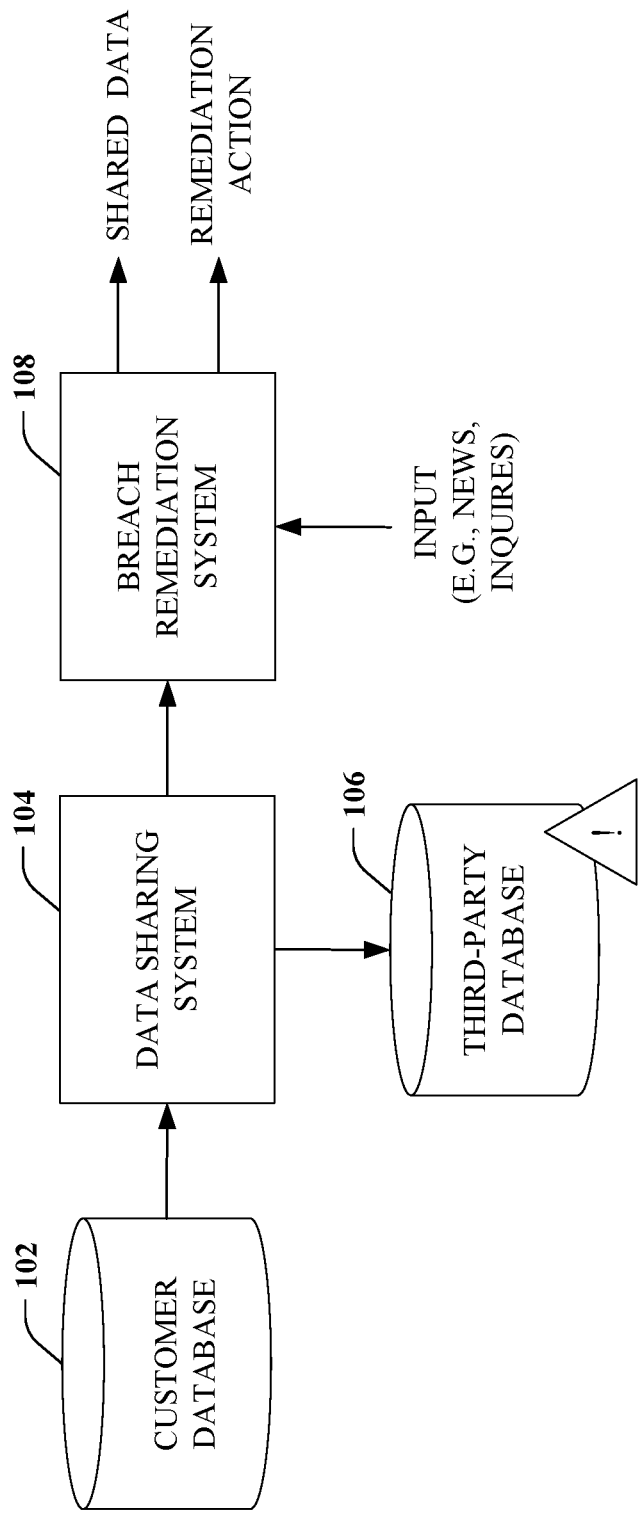
FIG. 1 illustrates an overview of an example implementation.

Referring initially to FIG. 1, an overview of an example implementation is illustrated and described. As depicted, the implementation includes customer database 102, data sharing system 104, third-party database 106, and breach remediation system 108. Customer database 102 stores data regarding customers of a particular business. For example, the business can be a financial service business that stores sensitive and non-sensitive data regarding customer account holders.

The customer database may categorize customer's data. Data may be categorized based on the sensitivity of the data. The sensitivity of customer data may be determined based on a variety of measures. In some embodiments, the sensitivity of data is determined by the likelihood that the data can be used to impersonate the identity of a customer. For example, credit card information may be classified as highly sensitive, customer address information may be classified as somewhat sensitive, and customer purchase history may be classified as less sensitive.

The data sharing system 104 can be employed to share customer data with a third party. For instance, data can be shared with vendors that offer promotions that a customer seeks to acquire or use. By way of example, a financial service business, such as a bank, can post offers of select vendors on the bank's webpage or within a mobile banking application. Customers of the bank can select a promotional offer and personal data of the customer can be shared with the vendor as needed to take advantage of the offer. If the offer pertains to a magazine subscription, for instance, the shared data may be name and address. The shared data is subsequently stored in the third-party database 106 for subsequent use in processing an accepted offer, among other things.

The third-party database 106 may store customer data in various storage media. For example, the third-party database 106 may be a magnetic hard drive that is connected to a computational device such as a server. The third-party database 106 may be in the possession of a third party. The security of the storage of customer data with a third party depends on the security system of the third party. The data sharing system 104 may be configured to restrict the sharing of data to third parties that are trusted. Further, third parties that lose their trusted status may trigger a breach, whereby the customer data is removed from the third party that loses its trusted status. The data sharing system 104 may be selective such that highly sensitive data may only be shared with highly trusted third parties. The data sharing system 104 may segregate the sharing of data among third parties such that an individual third party is allowed access to the customer information of a limited percentage of customers. A data breach by the third party may limit the remedial action to the limited percentage of customers that had customer information shared with the breaching third party.

The data sharing system 104 stores every instance of customer data being transmitted from a first party to a third party. In the event that there is a breach in the third-party database 106, the data sharing system 104 may retrieve the data that has been shared and thus compromised. The data sharing system 104 may record the type of data that is shared, the customer associated with the shared data, the time and date that the data was shared, and the third-party database 106 that accepted the data. The data sharing system 104 may store various additional data that may aid in remedial action in the event of a breach.

When a breach is discovered to have occurred to a third-party database 106, the data sharing system 104 may analyze the data that was compromised. For example, the volume of the compromised data may be determined. Additionally, the sensitivity of the compromised data may be determined. Various other analyses may be performed by the data sharing system 104, such as but not limited to, determining the customers that have been compromised by a breach, determining a monetary value of the shared information, and determining a date range for the compromised data.

The breach remediation system 108 can also receive information about data shared with a third party from the data sharing system 104. The breach remediation system 108 can reveal this information to customers, for example in a user portal or dashboard, to provide transparency with respect to what data is shared and with whom. The breach remediation system 108 can be informed of the occurrence of a data breach from an external source including, but not limited to, a vendor subject to the breach. The breach remediation system 108 can further automatically identify breaches, for instance from news sources or social media posts. After a data breach is detected, the breach remediation system 108 is configured to initiate remediation action based on risk severity determined from at least compromised data types and customer affect. Remediation action can include customer notification, loss prevention, and loss reimbursement, among other things.

The breach remediation system 108 may accept various inputs such as news and inquiries to determine if a breach has occurred. For example, the breach remediation system 108 may receive reports related to data security. The breach remediation system 108 may be configured to read such reports and automatically determine if there has been a breach in data based on the reports. The breach remediation system 108 may also perform its own analysis based on targeted searches on the Internet. For example, the breach remediation system 108 may be configured to recognize the compromised data of a customer and track down the source of the compromised data. As such, the breach remediation system 108 may actively seek out data breaches that were heretofore unknown.

The breach remediation system 108 may be configured to take remedial action in response to the determination that a breach has occurred. The remedial action taken in response to a breach may be performed by a user or performed automatically. For example, the breach remediation system 108 may be leveraged by a user to notify all of the customers who have had customer data compromised as a result of a breach. Alternatively, the breach remediation system 108 may be configured to automatically perform a set of tasks in response to a breach.

Figure 2:
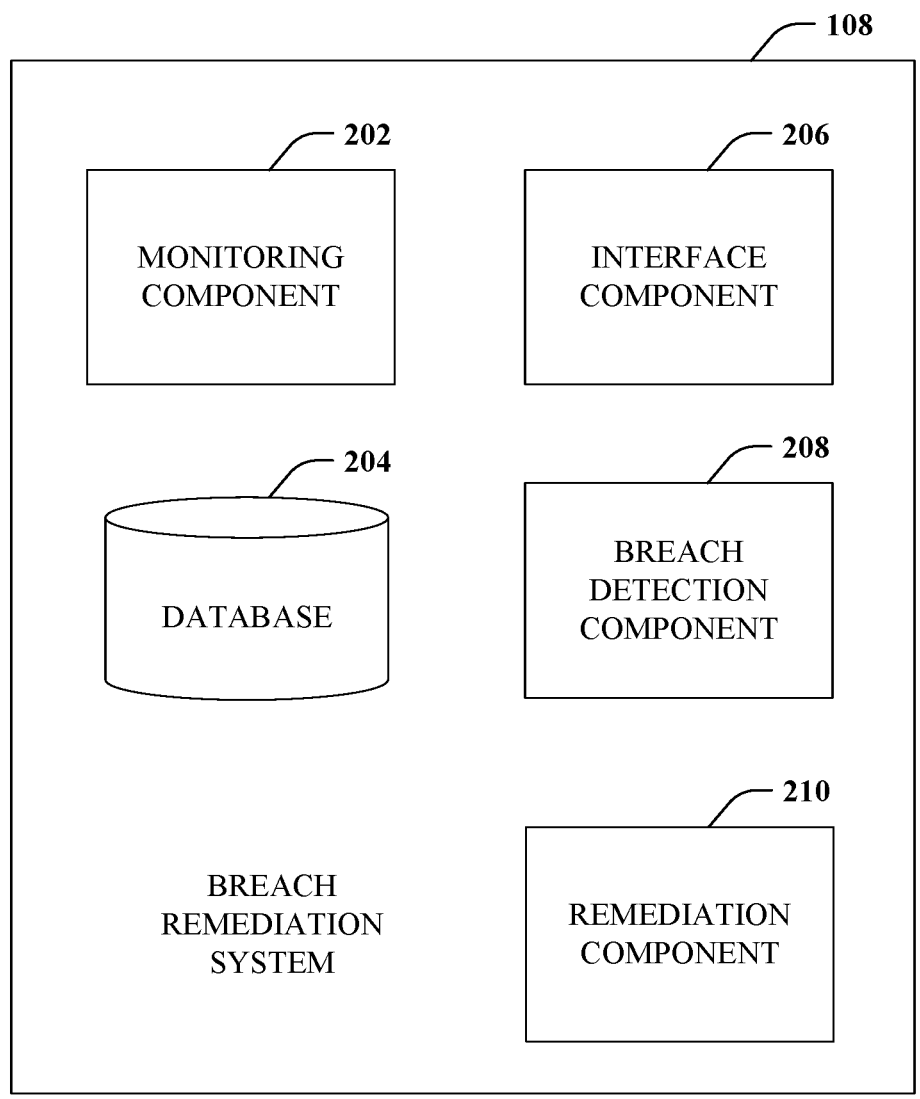
FIG. 2 is a schematic block diagram of a breach remediation system.

FIG. 2 depicts the breach remediation system 108 in further example detail. As shown, the breach remediation system 108 includes monitoring component 202, database 204, interface component 206, breach detection component 208, and remediation component 210. The breach remediation system 108 employs these components to monitor data sharing with third parties, provide transparent access to user data, identify data breaches, and remediate breaches.

The monitoring component 202 is a mechanism that monitors or tracks data sharing. In one instance, sharing of user data, maintained by a first party about a second party, with a third party is monitored. Here, user data or personal data is any information relating to an identifiable natural person. For example, user data includes name, address, or phone number. Further, user data can be sensitive or non-sensitive personal data. Sensitive information can include biometric information, religious beliefs, and racial or ethnic origin. Non-sensitive data can include name, address, email address, or a web cookie. A first party such as a bank can acquire and maintain data about second parties, namely their customers. In some instances, the first party can share user data regarding their customers with a third party, such as a vendor. For example, a bank may provide personalized promotions from vendors to customers upon online account access. Terms and conditions associated with the vendor promotion can dictate that upon selection of a promotion certain personal data will be shared with the vendor. The monitoring component 202 can identify the data shared and the entity to which the data was shared and save this information to the database 204, which is a non-volatile computer-readable storage medium. In one instance, such monitoring can be performed by a web browser or application plugin that gathers shared information.

The data saved by the monitoring component 202 may be retrieved in response to a data breach. Data analysis may also be performed on the data saved by the monitoring component 202. By identifying data to the entities to which the data was shared, the monitoring component 202 may determine the exact data that is or could have been compromised in the event of a data breach.

The interface component 206 can interact with the database 204 to retrieve and convey personal data to individuals with whom the personal data pertains. In accordance with one embodiment, the interface component 206 can construct a data monitoring dashboard showing a periodic (e.g., weekly, monthly . . . ) snapshot of data shared with vendors. Individuals can be provided with information regarding data shared that facilitates understanding as to which vendors utilize what data for a particular subscription or product purchased. In one instance, data sharing can utilize colors such as red, amber, and green to classify volumes of data shared to aid ease of comprehension. The red color could show a volume of data shared greater than seventy percent, amber could show a volume of data greater than forty percent and less than seventy percent, and green could show a volume of data shared from zero to seventy percent. Further, color, or another highlighting mechanism (e.g., bold, italics, underline, font, size, animation . . . ), can be utilized to identify sensitive information such as social security number shared. The interface component 206 can provide these or different graphic or other elements to aid a user in identifying what data was shared with whom.

A user may use the interface component 206 to determine the amount of their data being shared with various third parties. In various embodiments, the interface component 206 may allow the user to take measures to cease sharing data with untrusted third parties. For example, the user may cease visiting various websites or shopping with various third parties based on the information in the interface component 206.

Figure 3:
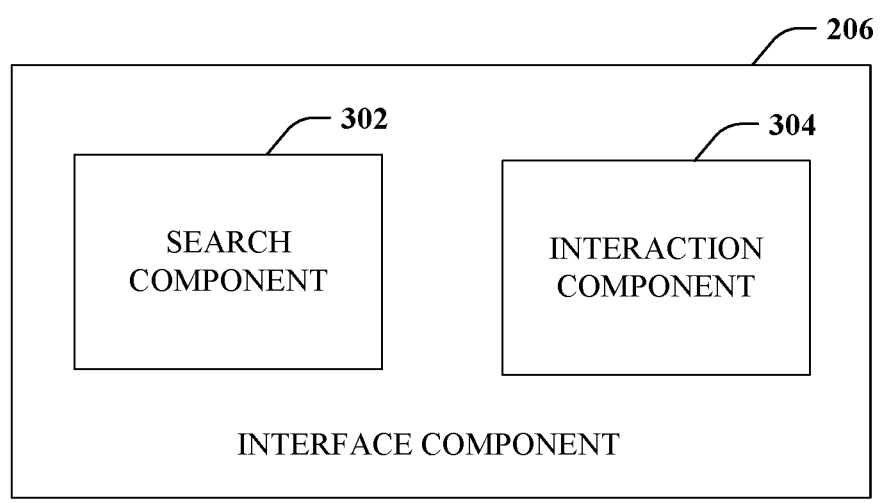
FIG. 3 is a schematic block diagram of an interface component.

Turning attention to FIG. 3, a sample interface component 206 is illustrated in further detail. The interface component 206 may include various components that facilitate the display of data that has been identified by the monitoring component 202 and saved to the database 204. The interface component 206 may also include various components that facilitate interaction of a user with the display of data. As shown, the interface component 206 includes search component 302. The search component 302 includes search functionality to facilitate location and retrieval of information regarding data sharing. The search component 302 can be employed with respect to acquiring data to populate a data monitoring dashboard produced by the interface component 206. The search component 302 can also be utilized with respect to additional functionality. For example, the search component 302 can be utilized to locate vendor promotions associated with sharing. In this manner, the validity of promotions received through other channels can be determined. For example, if an individual receives an email with a promotion, the search component 302 can be utilized to check if that promotion exists in the database 204. If the search results indicate that the promotion does not exist, this can indicate that such an email may be a phishing attempt.

The interface component 206 may be used to trigger a breach alert in response to a breach that is determined through use of the interface component 206. For example, the user may find fraudulent data through use of the search component 302 that indicates a breach. In another example, a user may discover a pattern based on a search that indicates a breach by a specific third party. The user may interact with the interface component 206 to initiate a remedial response.

The interface component 206 further includes interaction component 304. The interaction component 304 can work in conjunction with the search component 302 to enable interactive experiences. In one embodiment, the interaction component 304 can correspond to a data monitoring dashboard as described above. In another embodiment, the interaction component 304 can be a chat bot. The chat bot can be designed to conduct conversations audibly or textually in a manner that simulates human conversation. The chat bot can be configured to communicate regarding data breach occurrences. For example, an individual can call or text message and chat bot can confirm whether or not the individual is affected by a breach or not. Further, the chat bot can provide links or initiate a remediation process for those affected by a data breach.

Returning to FIG. 2, the breach detection component 208 is configured to detect or otherwise identify a data breach. In one instance, the breach detection component 208 can process a report from a target of a breach. In another instance, news reports, social media posts, or other sources of information can be analyzed to determine occurrence of a data breach. For example, news reports of a breach or possible breach of data with respect to a particular vendor can be analyzed and utilized as a basis for determining a data breach. In addition to detection, the breach detection component 208 can include additional functionality. For example, the breach detection component 208 can identify individuals affected by the breach, or in other words, those whose data has been compromised. This could be achieved by consulting the database 204 and determining who shared data with a breached entity. Further, the breach detection component 208 can determine what data or type of data is compromised by the breach. For example, it can be determined that name and address information is compromised. Further, categorization can be performed to identify compromised data as sensitive or non-sensitive data. Breach detection and results of additional processing can be saved to database 204 for access by the remediation component 210.

In response to a breach, the remediation component 210 may instruct the monitoring component 202 to determine the extent of the breach. The extent of the breach may be determined by the volume of customer information that is compromised. Alternatively, the extent of the breach may be determined by the degree of sensitivity of the customer information that has been compromised. And alternatively, the extent of the breach may be determined by the time that has passed from the time of the breach to the time that the breach was discovered. Multiple factors may also be used to determine the extent of a breach.

The breach detection component 208 may determine that a breach has occurred before the report of a breach by a third party. The breach detection component 208 may analyze compromised customer information that is discovered through various means to determine the source of the compromised customer information. As the monitoring component 202 keeps track of all customer information that is shared, data stored by the monitoring component 202 may be used to find the third party or third parties that have access to the compromised customer information. The third party or third parties that had access to a larger percentage of the compromised customer information may be flagged as a breaching third party or a probable breaching third party.

Actions may be taken in response to determining that one or more third parties have breached or are likely to have breached customer data. For example, the one or more third parties that are likely to have breached customer data may lose a trusted status whereby the data sharing system is less likely to share customer data with the breaching third party. Customers that have had customer data shared with the third party that is likely to have been breached may be informed that their data is compromised.

The remediation component 210 is a mechanism configured to remedy damage associated with a data breach for affected individuals. Remediation can vary based on what data was exposed and what losses were experienced or possible. In one instance, the remediation can be a reimbursement for a monetary loss. In another instance, remediation can correspond to actions such as notification, locking of accounts, and issuing new credit or debit cards, among other things.

Figure 4:
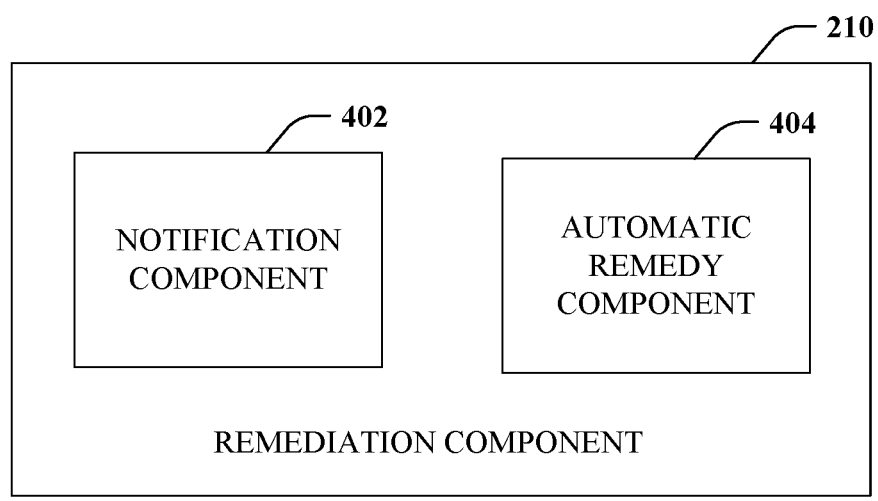
FIG. 4 is a schematic block diagram of a remediation component.

Turning attention to FIG. 4, a sample remediation component 210 is depicted in further detail. Here, the remediation component 210 includes notification component 402 and automatic remedy component 404. The notification component 402 is configured to notify individuals regarding a data breach. After data is compromised by a breach and affected individuals determined, the notification component 402 can notify individuals affected as well as unaffected by the breach by way of any number of communication mediums. For example, automated text messages, emails, or phone calls can be employed to provide such notification. In one instance, such notification can be provided by a chat bot upon a request by an individual.

The automatic remedy component 404 can trigger automatic remedial measures to halt future damage and provide a remedy for sustained harm. For example, additional monitoring can be triggered to detect suspicious actions. In another instance, accounts can be locked, credit or debit cards can be canceled, and new cards issued. Further, credit agencies, internal revenue service, or federal trade commission can be notified. Still further, if a monetary loss due to the data breach is below a predetermined threshold, an individual can be credited to reimburse the individual for the loss. Furthermore, automatic remedy component 404 can control action based on a risk severity, for example computed based on sensitivity of data compromised and number of individuals affected. In other words, automatic actions can be fine tailored to a situation in an attempt to address a data breach without causing undue inconvenience. In accordance with one embodiment, at least a subset of actions that can be triggered automatically by the automatic remedy component 404 can be presented as options for user selection within or in response to a notification by the notification component 402. In this manner, impacted individuals are provided with information regarding a breach and can tailor remediation to their particular risk thresholds.

In response to a breach, the data that was tracked by the monitoring component 202 may be analyzed to determine if the data was compromised. Relevant categories of data that may be analyzed include the third party with whom the data was shared, the time that the data was shared, and the customer associated with the data that was shared. The compromised data may be further analyzed to determine the extent of the data breach and the monetary value of a loss due to the breach.

In various embodiments, the automatic remedy component 404 may have a predetermined set of actions to perform in response to a breach. For example, the automatic remedy component 404 may be configured to restrict the further sharing of customer information from a breaching third party, perform an action that causes compromised customer information to be monitored, and determine the monetary losses caused by the breach. The predetermined steps taken by the automatic remedy component 404 may be dependent on the breach. For example, a predetermined step may be to determine the severity of a breach followed by a subsequent step that is based on the severity of the breach. A high severity breach may be a release of highly sensitive information, a release of a high volume of information, or both. The volume of information may be the volume of information per customer or the aggregate amount of customer information that was released.

The monetary loss due to a breach may be determined in various ways. In one example, the monetary loss may be calculated by the amount of customer information lost for each customer. In another example, the monetary loss is determined by the multiplication of each individual piece of customer information by a factor based on the individual piece of customer information. An individual piece of information representing a social security number may have a different factor than an individual piece of information representing an address. The various individual pieces of customer information may be multiplied by their respective factors and added to determine the monetary loss for each customer.

The automatic remedy component 404 may modify the sharing of data by the data sharing system 104. For example, the data sharing system 104 may be modified to restrict the sharing of data with one or more third-party databases 106 as an automatic remedy to a breach. The sensitivity of data that is shared by the data sharing system 104 may be modified as well. For example, highly sensitive data may be automatically restricted in response to a breach whereas less sensitive data may continue to be shared by the data sharing system 104.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. By way of example, and not limitation, such mechanisms can be utilized by the breach remediation system 108 to detect data breaches from news and other sources as well as part of a user interface to enable intelligent responses to queries and interactions. For instance, machine learning and natural language processing can be employed to identify data breaches from sources.

In view of the exemplary systems described above, methods that may be implemented in accordance with the disclosed subject matter will be better appreciated with reference to flow chart diagrams of FIGS. 5-8. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
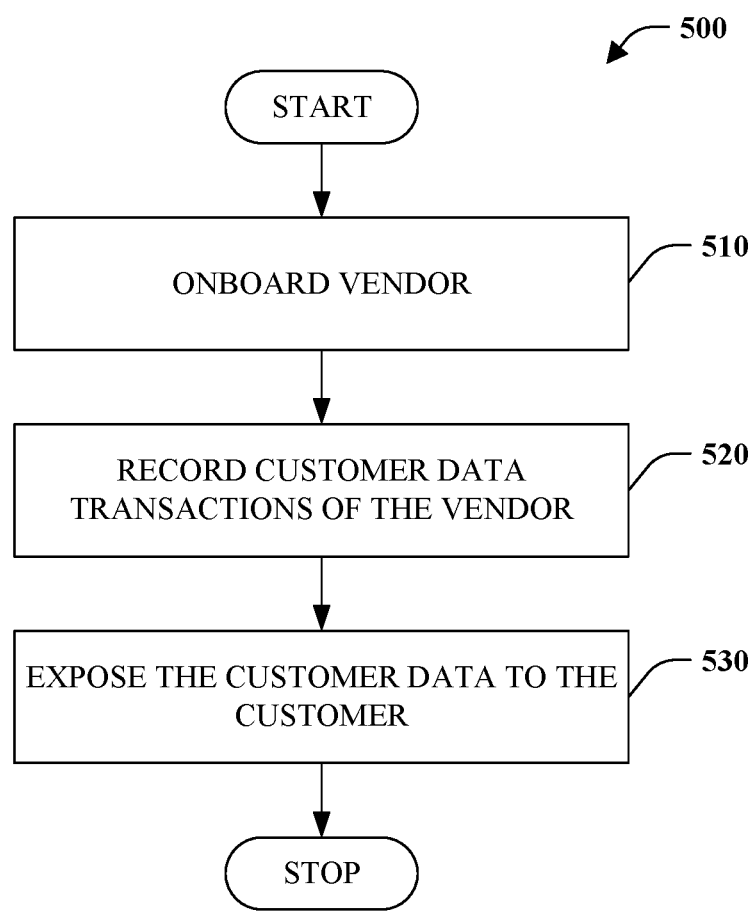
FIG. 5 is a flow chart diagram of a method of data sharing transparency.

FIG. 5 illustrates a method of data sharing transparency 500 in accordance with an aspect of this disclosure. The breach remediation system 108 can perform the method 108. More specifically, the monitoring component 202 and the interface component 206 in conjunction with the database 204 can implement the method. At reference numeral 510, a vendor or other third party is on boarded. In other words, the vendor is accepted for use in presenting promotional materials with concomitant data sharing. The on boarding process can involve the vendor agreeing to predetermined requirements and accepting certain terms and conditions.

At numeral 520, customer data transactions of the vendor are recorded. Here, data transactions correspond to instances of data sharing associated with selection of a promotion by a customer or other user. For example, after a promotion presented on an entity's webpage is selected or otherwise activated by a customer or client of the entity, data about that customer or client is shared by the entity with a third-party vendor associated with the promotion. In this case, the shared data, or information about the data shared, such as type of data, can be saved in a database or other persistent store.

At 530, customer data is exposed to the relevant customer upon request. In accordance with one embodiment, a data monitoring dashboard can be presented that reveals customer personal data shared with particular vendors. As such, customers can acquire information about data shared with vendors to determine which vendors utilize what data for a particular subscription or product purchased, for example. In this manner, the customer is provided with substantially real time availability of data sharing history. Further, exposing this data allows the customer to determine risk with respect to data being shared with a third party. In one instance, the data monitoring dashboard highlight or distinguish particular data such as volume of data shared and data sensitivity.

Figure 6:
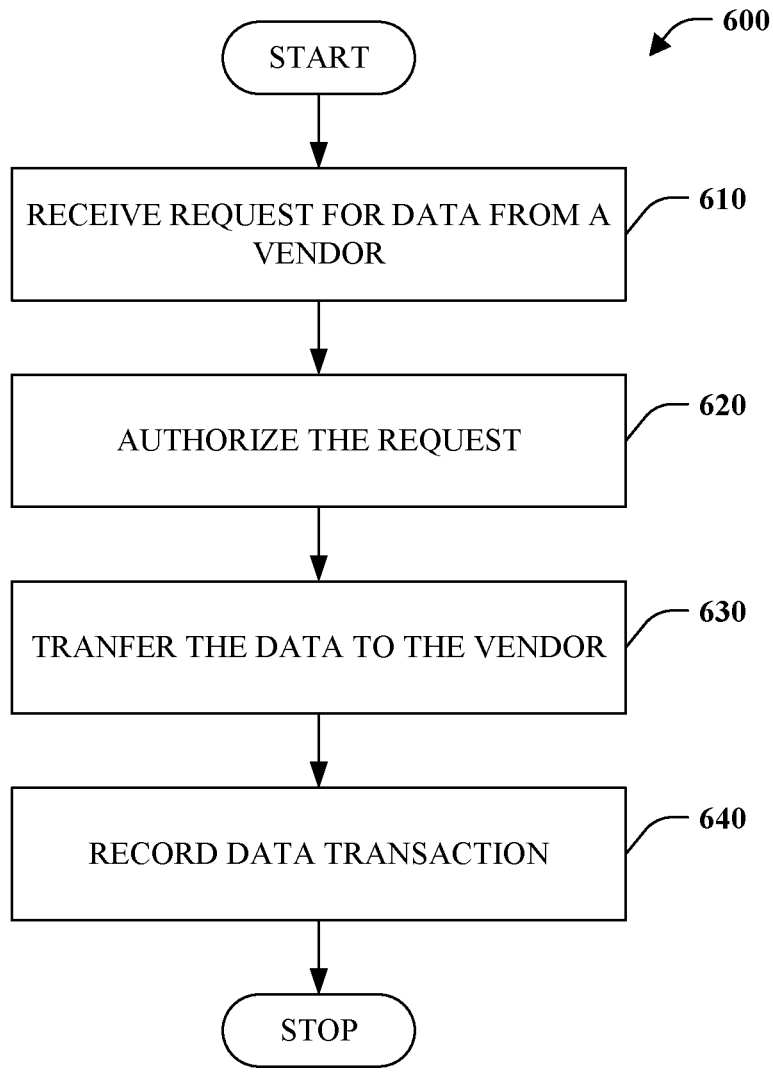
FIG. 6 is a flow chart diagram of a method of sharing data.

FIG. 6 depicts a method of data sharing 600. The method can be performed by one or more components of the breach remediation system 108 such as monitoring component 202. At reference numeral 610, a request is received from a vendor, or other third party, for user data regarding a customer. The request is investigated to determine whether there is a relationship with the vendor in which an agreement was reached to provide such information and whether terms or conditions of such sharing are met. If the vendor is authorized based on the aforementioned factors, the request is authorized at 620. Otherwise, the method simply terminates optionally with a message regarding the reason for termination. At numeral 630, the requested data is transferred to the authorized vendor. At numeral 640, the data transaction associated with transfer of the data to the vendor is recorded. Here the actual data can be saved or information describing the data (e.g., name, address, social security number . . . ). The data transaction is saved to a data store to maintain a record of what data is transferred and to whom.

The record of the data transaction allows the breach remediation system 108 to determine the exact data that was shared in the event that the data was compromised. The record of the data transaction also allows the breach remediation system 108 to identify the customers who have had data compromised. Based on the extent of the breach, those customers may be notified of the breach. Additionally, law enforcement may be notified of the extent of a breach along with the list of compromised customers. As such, the record of the data transaction facilitates various aspects of the breach remediation system 108.

Figure 7:
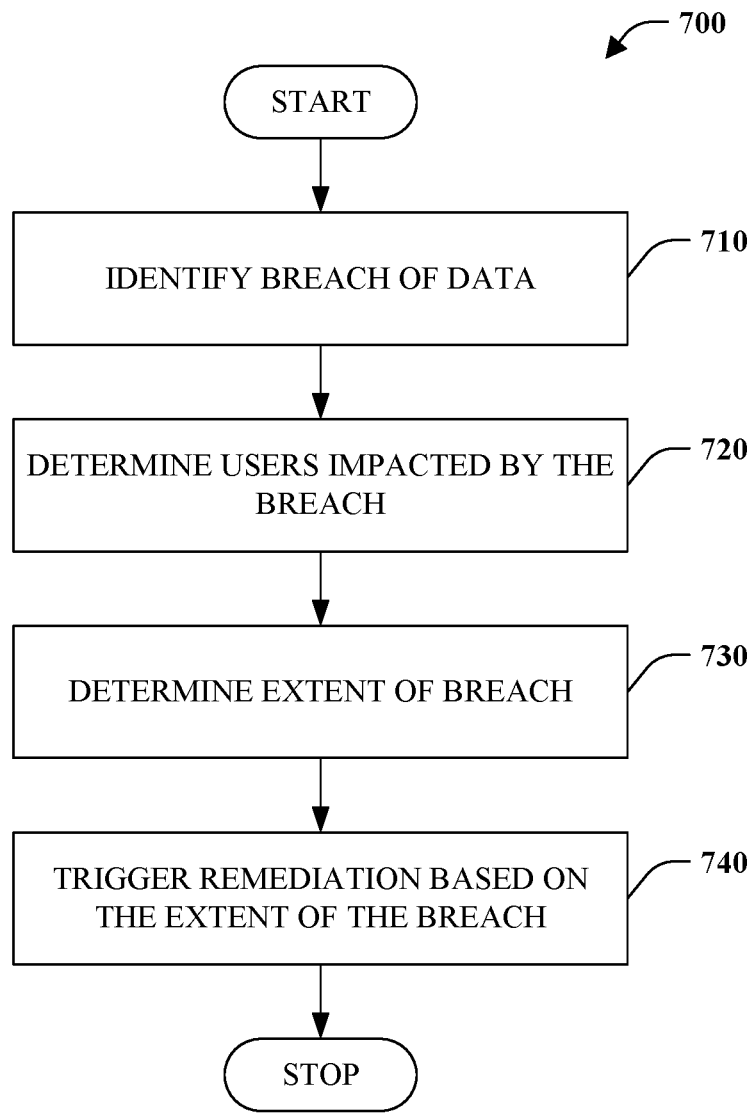
FIG. 7 is a flow chart diagram of a data breach remediation method.

A breach remediation method 700 is shown in FIG. 7. The method can be performed by the breach remediation system 108 including breach detection component 208 and remediation component 210. At reference numeral 710, a data breach is identified. The data breach can be identified based on a report provided from a breached vendor system. Alternatively, news feeds, social media posts, and other information sources are analyzed to identify occurrence of a breach. For example, a news report can indicate that a particular vendor experienced a data breach, which can be detected by this method, for example utilizing text analysis.

At numeral 720, users impacted by the breach are determined. For example, a database of data sharing transactions can be searched to locate individuals whose information was shared with the vendor that experienced the breach.

At 730, the extent of the breach is determined. The extent of the breach can capture risk severity of compromised data and level of affect. Risk severity can be determined based on sensitivity of the data exposed. Non-sensitive information such as first name is less severe than sensitive information such as social security number. The risk severity can be a measure that accounts for the sensitivity of all data compromised. Risk severity can also capture the volume of data compromised. For example, regardless of sensitivity, a large volume of compromised data is worse than a small volume. The extent of a breach can also be captured by the level of affect, or in other words, the number of individuals whose data is compromised by the breach. These and other factors can be considered and contribute to a risk severity metric.

At numeral 740, remediation is triggered based on the extent of the breach. In accordance with one embodiment, remediation can include notifying individuals affected by the breach as well as those unaffected by the breach. Notification can be performed with one or more of substantially any communication medium including but not limited to text message, email, or application alert. Additional monitoring of user information and accounts and placing a hold on an account can also be performed. Remediation actions can further include but are not limited to requesting a temporary hold for credit agencies as well as contacting the internal revenue service or federal trade commission. In some instances where a monetary loss is caused by the data breach is below a threshold amount, remediation can include crediting affected individual accounts to reimburse them for the loss.

Figure 8:
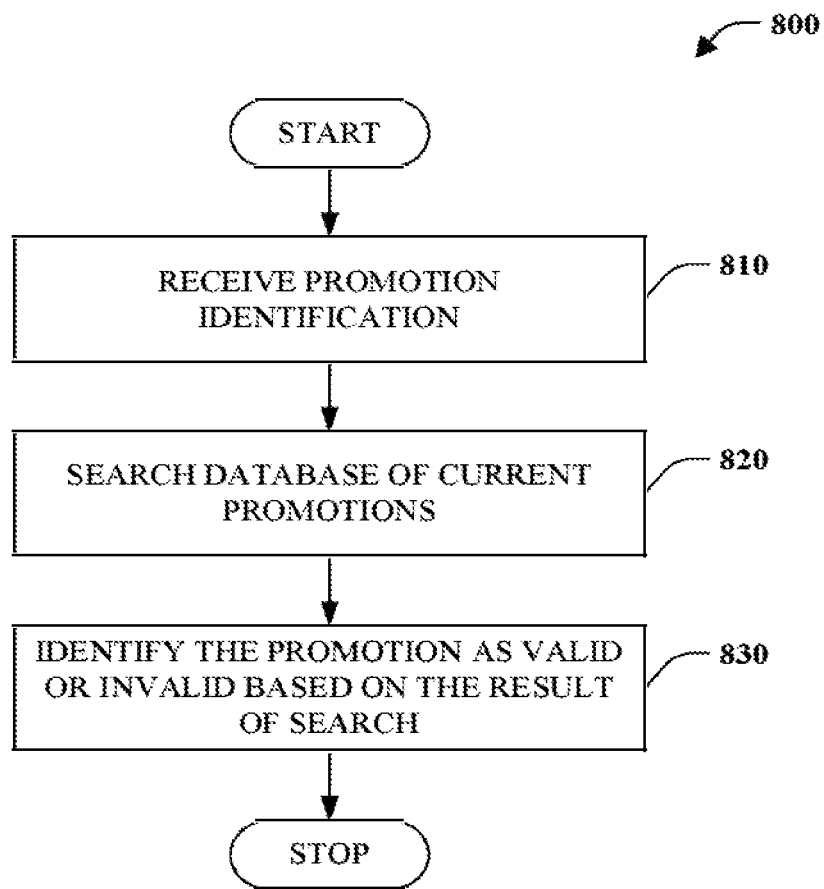
FIG. 8 is a flow chart diagram of a promotion verification method.

FIG. 8 is a flow chart diagram of a method of promotion verification 800. The method can be performed by the breach remediation system 108 and more specifically the interface component 206 operating over data stored in the database 204. At reference numeral 810, promotion identification is received. The promotion can correspond to a vendor discount offer. At numeral 820, a search of a database is performed for the received promotion identification. At 830, a determination is made as to whether the promotion is valid or can be deemed invalid. If the promotion is located, the promotion can be deemed valid. The method facilitates identification of invalid promotions that may be used in a phishing attack.

A promotion that is determined to be invalid may be flagged as a potential breach causing attack. Third parties may be queried to determine if the third parties were compromised by the invalid promotion such as the phishing attack. In the event that a third party was compromised, the breach detection component 208 may trigger a breach whereby the remediation component 210 is activated. The remediation component 210 may compile the customer data that was compromised by the phishing attack and take the appropriate action such as notifying the affected customers and the authorities.

Figure 9:
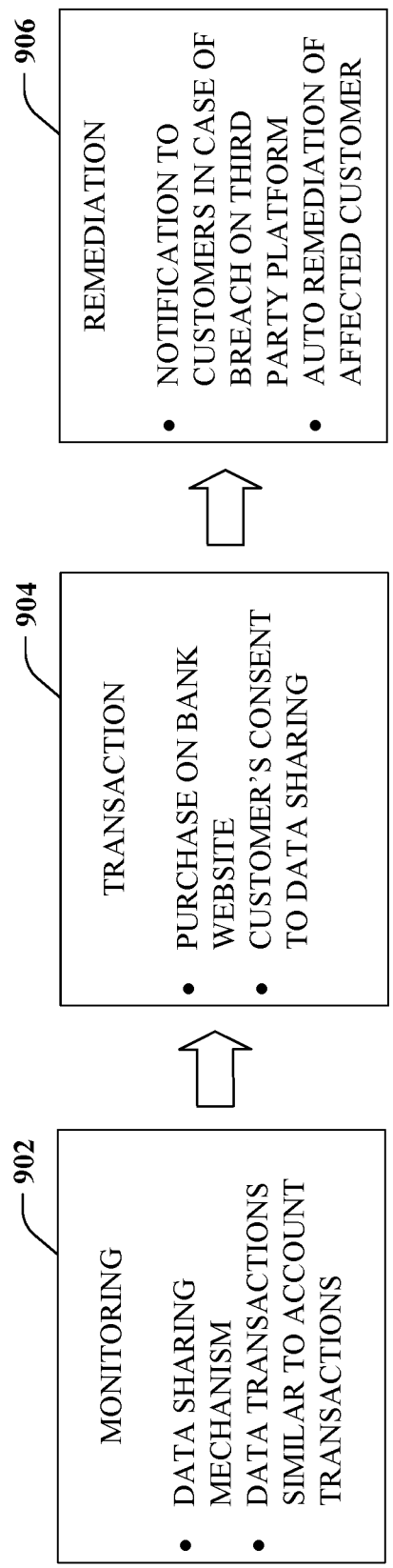
FIG. 9 is a block diagram of operational flow.

FIG. 9 depicts a high-level operational flow. At 902, monitoring can be performed. The monitoring can provide a data sharing mechanism. For instance, a monitoring dashboard can be provided to show a snapshot of data shared with a vendor. Further, data transactions can be similar to account transactions. At 904, the transactions can occur, for example by way of a bank website, wherein a customer consents to data sharing. For example, customers utilizing online banking can view different promotions upon online account access. A promotion can include terms and conditions that certain data would be shared with a vendor upon clicking a promotional link. At 906, remediation can be performed. For instance, notification can be provided to customers in case of a breach on a third party platform. In one instance, remediation can be performed automatically for an affected customer.

Aspects of this disclosure are described with respect to sharing of data between parties. In one instance, the disclosure highlights utilization in the context of a financial institution. However, aspects of the disclosure are applicable to many other domains. Consider healthcare, for example. A hospital website could present an offer for a discount associated with healthcare related items from a vendor. If a user selects the offer, information about the user could be shared in the background to take advantage of the offer. Moreover, the user can be provided with information regarding what information has been shared and with which vendor and thereby provide a sense of security.

In accordance with one embodiment, a user can be informed of data that is to be shared with a third party prior to sharing. In one instance, the user can consent to sharing of particular data with a specific party. For example, while logged into a mobile banking application a vendor promotion can be displayed. Upon selecting the promotion, a user can be notified of the personal date concerning the user that is shared with the vendor in substantially real time. Further, the user may be solicited prior to sharing the data with the vendor.

In one instance, the breach remediation system 108 and associated functionality can be performed by a second party system or service, such as that of a financial institution. However, the disclosed subject matter is not limited thereto. For example, the system and functionality can be performed by a fourth party utilized by the second party (e.g., bank) to share information about a first party (e.g., customer) with a third party (e.g., vendor).

Aspects of the subject disclosure concern the technical problems of electronic data sharing and breaches. More particularly, user data of an individual can be shared by a first party with a second party without knowledge of the individual for which the data pertains. Subsequently, a breach can occur with respect to the second party compromising the shared data. The problems are solved with technical processes of monitoring data sharing; exposing what data is shared and with whom to an individual to whom the data pertains, and providing remediation actions in response to detection of a breach based on the data compromised. Among other things, such aspects provide a sense that data transactions are secure, traceable, and auditable.

The subject disclosure provides for various products and processes that are configured to reveal shared data and perform data breach remediation and various functionality related thereto. What follows are one or more exemplary systems and methods.

A system comprises a processor coupled to a memory that includes instructions that when executed by the processor cause the processor to: monitor electronic sharing of user data of customers of a first party with a third party; identify customers affected by a data breach associated with the third party; identify the user data shared with the third party; and initiate remediation after the data breach is determined based on the customers affected and the user data shared with the third party. In one instance, the first party is a financial institution, or the third party can be a vendor. Further, the user data is shared by the first party with the third party and the user data is shared after selection of a promotion of the third party presented by the first party. The system can further comprise instructions that cause the processor to automatically detect the breach based on analysis of news reports or receive a breach report from the third-party identifying occurrence of the data breach. In one instance, the remediation can comprise notification of one or more of users affected by the breach or user unaffected by the breach. The instructions further cause the processor to monitor web browser activity and identify the sharing of use data from the web browser activity. Further yet, the instructions can cause the processor to trigger automatic reimbursement for a financial loss within a threshold value caused by the breach.

A method comprises executing, on a processor, instructions that cause the processor to perform operations comprising: monitoring electronic sharing of user data of customers of a first party with a third party; detecting a data breach with respect to the third party; identifying customers affected by the data breach; determining the user data shared with the third party; and initiating remediation after the data breach is determined based on the customers affected and the user data shared with the third party. The operations further comprise monitoring web browser activity and identifying the sharing of user data from the web browsing activity. The method further comprises operations for notifying of one or more of users affected by the breach or users unaffected by the breach. The operations further comprise triggering automatic reimbursement for a financial loss within a threshold value caused by the breach. The operations also comprise the operations further comprise determining risk severity and level of affect based on the user data shared and the customers affected and initiating the remediation based on the risk severity and level of affect. Operations of the method further comprise presenting to the customer a dashboard identifying the user data and the third party with which the user data was shared.

A method comprises executing, on a processor, instructions that cause the processor to perform operations comprising: monitoring electronic sharing of user data of customers of a financial institution with third-party vendors of the financial institution, wherein the sharing occurs after activation of a promotional link associated with a third party vendor; saving a representation of the data shared with the vendor for the customers; generating a graphical dashboard identifying the user data and the vendor with which user data was shared; and conveying, for display on a display device, the graphical dashboard. The operations further comprise identifying the data shared with the vendor after occurrence of a vendor data breach. The operations also comprise triggering remediation after the data breach based on the data shared with the vendor and comprising automatically detecting the breach based on analysis of news reports.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
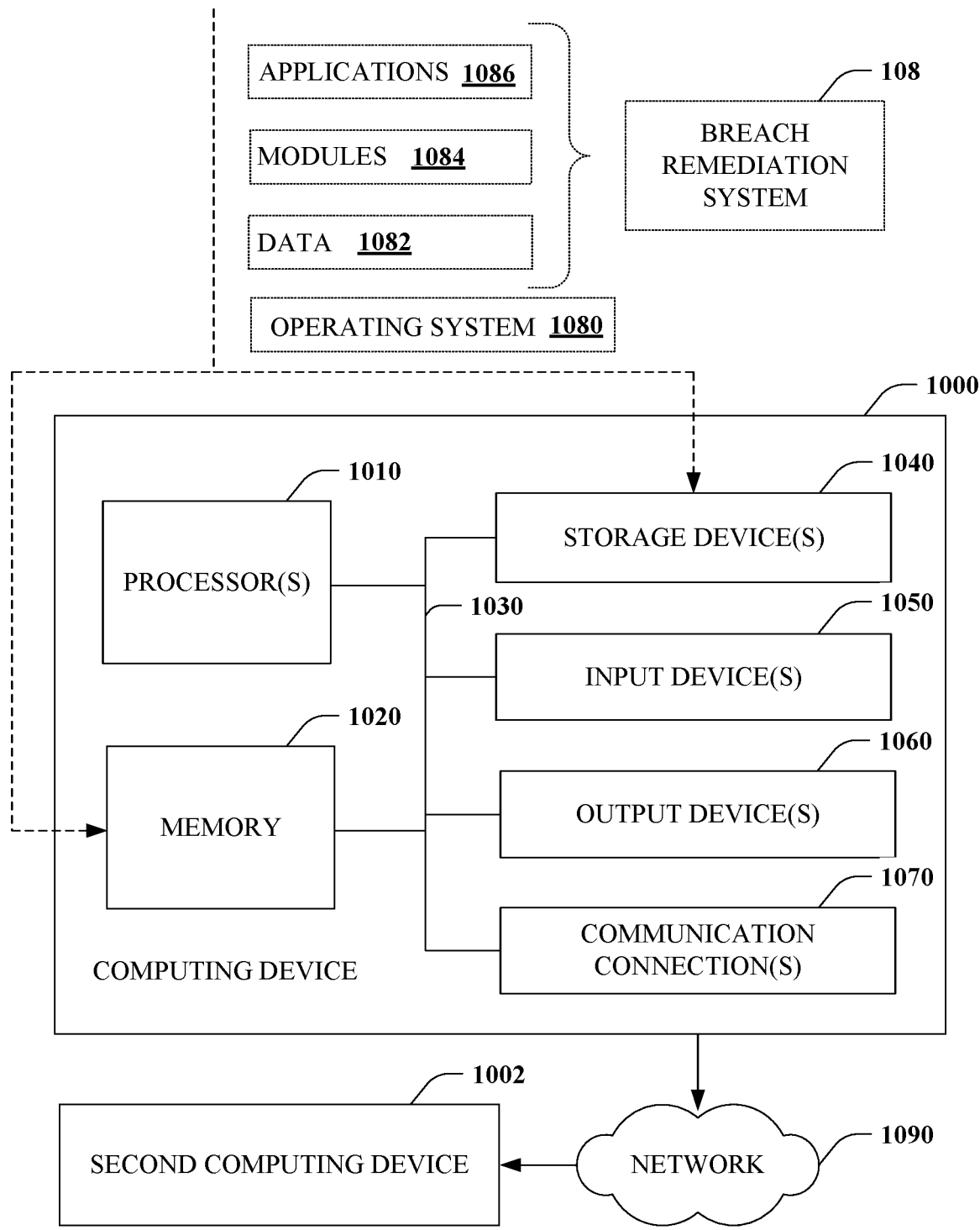
FIG. 10 is a schematic block diagram illustrating a suitable operating environment for aspects of the subject disclosure.

To provide a context for the disclosed subject matter, FIG. 10 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that is accessible to the computing device 1000 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the decisioning system 100 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the decisioning system 100 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In accordance with one implementation, the computing device 1000 can execute the breach remediation system 108, which is accessible by the second computing device 1002 associated with a user or customer. For example, the computing device 1000 can form part of a network service platform that exposes the breach remediation system 108 as a service to the second computing device 1002.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
 a processor coupled to a memory that includes instructions that when executed by the processor cause the processor to:
 onboard, by a first party, a third party to enable one or more digital promotions of the third party to be presented within a digital space of the first party;
 record, by the first party, a plurality of instances of electronic user data sharing by customers of the first party with the third party, wherein the electronic user data sharing occurs in response to the customers engaging with the one or more digital promotions of the third party within the digital space of the first party;
 convey, to a first customer of the customers, a graphical data monitoring dashboard providing a data sharing history to the first customer in real-time, wherein the graphical data monitoring dashboard indicates first electronic user data of the first customer that has been shared with the third party, a volume of the first electronic user data, and a sensitivity level of the first electronic user data;

identify, by the first party and based on an identified data breach associated with the third party, the customers having engaged with the one or more digital promotions of the third party and particular electronic user data of the customers that was shared with the third party based on the recorded plurality of instances; and initiate remediation after the data breach is determined based on the identified customers and the particular electronic user data that was shared with the third party, wherein initiating remediation comprises:

triggering automatic monetary reimbursement for an impact caused by the data breach.

2. The system of claim 1, wherein the first party is a financial institution.

3. The system of claim 1, wherein the third party is a vendor.

4. The system of claim 1, wherein the electronic user data is shared by the first party with the third party.

5. The system of claim 1, further comprising instructions that cause the processor to automatically detect the data breach based on analysis of news reports.

6. The system of claim 1, further comprising instructions that cause the processor to receive a breach report from the third party identifying occurrence of the data breach.

7. The system of claim 1, wherein the remediation comprises notification of one or more of users affected by the data breach.

8. The system of claim 1, further comprising instructions that cause the processor to monitor web browser activity and identify the sharing of the electronic user data from the web browser activity.

9. A method, comprising:

executing, on a processor, instructions that cause the processor to perform operations comprising:

onboarding, by a first party, a third party to enable one or more digital promotions of the third party to be presented within a digital space of the first party;

recording, by the first party, a plurality of instances of electronic user data sharing by customers of the first party with the third party, wherein the electronic user data sharing occurs in response to the customers engaging with the one or more digital promotions of the third party within the digital space of the first party;

conveying, to a first customer of the customers, a graphical data monitoring dashboard providing a data sharing history to the first customer in real-time, wherein the graphical data monitoring dashboard indicates first electronic user data of the first customer that has been shared with the third party, a volume of the first electronic user data, and a sensitivity level of the first electronic user data;

identifying, by the first party and based on an identified data breach associated with the third party, the customers having engaged with the one or more digital promotions of the third party and particular electronic user data of the customers that was shared with the third party based on the recorded plurality of instances; and initiating remediation after the data breach is determined based on the identified customers and the particular electronic user data that was shared with the third party, wherein initiating remediation comprises:

triggering automatic monetary reimbursement for an impact caused by the data breach.

10. The method of claim 9, the operations further comprising monitoring web browsing activity and identifying the sharing of electronic user data from the web browsing activity.

11. The method of claim 9, the operations further comprising notifying of one or more customers affected by the data breach.

12. The method of claim 1, the operations further comprising:

determining risk severity and level of affect based on the particular electronic user data that was shared and the customers associated with the particular electronic user data; and initiating the remediation based on the risk severity and the level of affect.

13. A method, comprising:

executing, on a processor, instructions that cause the processor to perform operations comprising:

onboarding, by a first party, a third party to enable one or more digital promotions of the third party to be presented within a digital space of the first party;

recording, by the first party, a plurality of instances of electronic user data sharing by customers of a first party with the third party, wherein the electronic user data sharing occurs in response to the customers engaging with the one or more digital promotions of the third party within the digital space of the first party;

conveying to a first customer of the customers, a graphical data monitoring dashboard providing a data sharing history to the first customer in real-time, wherein the graphical data monitoring dashboard indicates first electronic user data of the first customer that has been shared with the third party, a volume of the first electronic user data, and a sensitivity level of the first electronic user data;

identifying, by the first party and based on an identified data breach associated with the third party, the customers having engaged with the one or more digital promotions of the third party and particular electronic user data of the customers that was shared with the third party based on the recorded plurality of instances; and initiating remediation after a data reach as after the data breach is determined based on the identified customers and the particular electronic user data that was shared with the third party, wherein initiating the remediation comprises:

triggering automatic monetary reimbursement for an impact caused by the data breach.

14. The method of claim 13, the operations further comprising automatically detecting the data breach based on analysis of news reports.

15. The system of claim 1, further comprising instructions that cause the processor to issue a replacement physical payment card to at least one customer of the customers affected by the data breach.

16. The system of claim 1, wherein initiating remediation further comprises determining a monetary amount to reimburse for the data breach based on at least one of (i) an amount of the electronic user data shared with the third party and (ii) a sensitivity of the electronic user data shared with the third party, and wherein triggering the automatic monetary reimbursement for the impact caused by the data breach comprises crediting the monetary amount to at least one account associated with the customers affected by the data breach.

17. The system of claim 1, further comprising:
adjusting a trusted status of the third party in relation to the first party based on the data breach.

* * * * *